(12) United States Patent
Hulteen et al.

(10) Patent No.: US 10,662,644 B2
(45) Date of Patent: May 26, 2020

(54) PENETRATION FIRESTOP SYSTEM (71) Applicant: 3M INNOVATIVE PROPERTIES COMPANY, St. Paul, MN (US)

(72) Inventors: John C. Hulteen, Afton, MN (US); George W. Frost, Afton, MN (US); Richard J. Haffner, New Richmond, WI (US); Ernst L. Schmidt, Hager City, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/564,761

(22) PCT Filed: Mar. 30, 2016

(86) PCT No.: PCT/US2016/024821
§ 371 (c)(1),
(2) Date: Oct. 6, 2017

(87) PCT Pub. No.: WO2016/167956
PCT Pub. Date: Oct. 20, 2016

(65) Prior Publication Data
US 2018/0112395 A1 Apr. 26, 2018

Related U.S. Application Data

(60) Provisional application No. 62/149,122, filed on Apr. 17, 2015.

(51) Int. Cl.
*E04B 1/94* (2006.01)
*F16L 5/02* (2006.01)
*A62C 2/06* (2006.01)
*E04B 1/68* (2006.01)
*F16L 5/04* (2006.01)

(52) U.S. Cl.
CPC .............. *E04B 1/947* (2013.01); *A62C 2/065* (2013.01); *E04B 1/6801* (2013.01); *E04B 1/6803* (2013.01); *E04B 1/948* (2013.01); *F16L 5/025* (2013.01); *F16L 5/04* (2013.01)

(58) Field of Classification Search
CPC ...... E04B 1/947; E04B 1/6801; E04B 1/6803; F16L 5/04; A62C 2/065
USPC ....................................................... 52/317
See application file for complete search history.

(56) References Cited

U.S. PATENT DOCUMENTS

| 4,018,962 A | 4/1977 | Pedlow |
| 4,018,983 A | 4/1977 | Pedlow |
| 4,273,821 A * | 6/1981 | Pedlow .................. C09D 5/185 106/18.11 |

(Continued)

FOREIGN PATENT DOCUMENTS

| DE | 10223688 | 12/2003 |
| DE | 202013100836 | * 7/2014 |

(Continued)

OTHER PUBLICATIONS

International Search Report for PCT International Application No. PCT/US2016/024821, dated Jun. 30, 2016, 4 pages.

*Primary Examiner* — Adriana Figueroa
(74) *Attorney, Agent, or Firm* — Julie Lapos-Kuchar (57) ABSTRACT

Described herein is a firestop for construction assemblies comprising a penetration wherein a packing material and a non-porous adhesive article are used to fill and seal the opening.

19 Claims, 2 Drawing Sheets

(56) References Cited

U.S. PATENT DOCUMENTS

| | | | | |
|---|---|---|---|---|
| 4,329,384 | A | 5/1982 | Vesley | |
| 4,330,590 | A | 5/1982 | Vesley | |
| 4,548,853 | A * | 10/1985 | Bryan | F16L 5/04 428/131 |
| 4,901,488 | A * | 2/1990 | Murota | F16L 5/04 52/232 |
| 5,058,346 | A * | 10/1991 | Spaeth | F16L 5/04 52/220.8 |
| 5,103,609 | A * | 4/1992 | Thoreson | A62C 2/065 52/232 |
| 5,105,592 | A * | 4/1992 | MacMillan | F16L 5/04 52/232 |
| 5,374,477 | A | 12/1994 | Lawless et al. | |
| 5,452,551 | A * | 9/1995 | Charland | A62C 2/065 52/1 |
| 5,548,934 | A * | 8/1996 | Israelson | A62C 2/065 52/1 |
| 5,974,750 | A * | 11/1999 | Landin | E04B 1/948 52/396.01 |
| 6,441,092 | B1 * | 8/2002 | Gieselman | A61L 15/58 525/191 |
| 6,530,187 | B2 * | 3/2003 | Shimizu | F16L 5/02 52/220.1 |
| 6,536,169 | B2 | 3/2003 | Dykhoff | |
| 6,948,287 | B2 * | 9/2005 | Korn | E04B 1/68 277/510 |
| 7,082,730 | B2 * | 8/2006 | Monden | F16L 5/04 138/161 |
| 7,568,314 | B2 * | 8/2009 | Collins | H02G 3/22 52/219 |
| 7,797,893 | B2 * | 9/2010 | Stahl, Sr. | F16L 5/04 52/220.8 |
| 8,097,310 | B2 | 1/2012 | Miller | |
| 8,146,305 | B2 | 4/2012 | Cordts | |
| 8,393,121 | B2 * | 3/2013 | Beele | F16L 5/04 169/45 |
| 8,490,338 | B2 * | 7/2013 | Longo | C09J 7/38 52/58 |
| 8,590,272 | B2 | 11/2013 | Thomas | |
| 8,636,076 | B2 * | 1/2014 | Cordts | A62C 2/06 169/45 |
| 8,813,450 | B1 * | 8/2014 | Hensley | E04B 1/6804 52/317 |
| 9,151,042 | B2 * | 10/2015 | Simon | E04B 1/944 |
| 9,562,174 | B2 * | 2/2017 | Russell | B32B 7/12 |
| 9,689,158 | B1 * | 6/2017 | Hensley | E04B 1/68 |
| 2004/0016193 | A1 * | 1/2004 | Stahl, Sr. | A62C 2/065 52/317 |
| 2004/0137185 | A1 | 7/2004 | Sieber et al. | |
| 2004/0168398 | A1 * | 9/2004 | Sakno | F16L 5/04 52/741.4 |
| 2005/0034389 | A1 | 2/2005 | Boot | |
| 2006/0027388 | A1 | 2/2006 | Collins | |
| 2009/0197060 | A1 | 8/2009 | Cho | |
| 2010/0159180 | A1 | 6/2010 | Segur | |
| 2011/0113709 | A1 | 5/2011 | Pilz | |
| 2011/0302860 | A1 | 12/2011 | Cordts | |
| 2012/0085063 | A1 * | 4/2012 | Pufahl | B32B 3/30 52/741.4 |
| 2012/0097405 | A1 | 4/2012 | Cordts | |
| 2013/0234404 | A1 * | 9/2013 | Coscarella | F16L 5/02 277/606 |
| 2014/0008086 | A1 | 1/2014 | Foerg | |
| 2015/0267016 | A1 * | 9/2015 | Humiston | C08J 5/18 428/61 |

FOREIGN PATENT DOCUMENTS

| | | | |
|---|---|---|---|
| EP | 0161557 A2 * | 11/1985 | F16L 5/022 |
| EP | 0161557 | 7/1989 | |
| GB | 2472402 | 2/2011 | |
| GB | 2522934 | 8/2015 | |
| JP | 07-42271 | 2/1995 | |
| JP | H07-049178 | 11/1995 | |
| JP | 10-185009 | 7/1998 | |
| WO | WO 94/20055 | 9/1994 | |
| WO | WO 2003-038206 | 5/2003 | |
| WO | WO 2016-167937 | 10/2016 | |
| WO | WO 2016/167938 | 10/2016 | |
| WO | WO 2016/168169 | 10/2016 | |

* cited by examiner

PENETRATION FIRESTOP SYSTEM

CROSS REFERENCE TO RELATED APPLICATIONS

This application is a national stage filing under 35 U.S.C. 371 of PCT/US2016/024821, filed Mar. 30, 2016, which claims the benefit of U.S. Application No. 62/149,122, filed Apr. 17, 2015, the disclosure of which is incorporated by reference in its/their entirety herein.

TECHNICAL FIELD

A penetration firestop system is described comprising an adhesive article and a packing material.

BACKGROUND

Building codes for commercial structures (e.g., apartments, office buildings) generally require a passive fire protection system to contain and/or slow the spread of a fire. Fire-resistant materials such as walls and doors are used. However, sometimes there are openings present in the walls, ceilings, and floors to allow for penetrating items (such as cables, pipes, ducts, conduits, etc.) through the building. These openings need to be restored to prevent flame and hot gases from passing through the openings into adjoining areas.

SUMMARY

There is a desire to identify alternative firestop materials for treating construction assemblies comprising penetrations, which may allow advantages in ease of use, range of use, and/or aesthetics. These alternative firestop systems must also be fire-resistant.

In one aspect, the use of a non-porous adhesive article and a packing material on a construction assembly to provide a firestop system is described wherein the non-porous adhesive article comprises a substrate and an adhesive disposed on a first major surface of the substrate;
wherein the construction assembly comprises a first major surface and an opposing second major surface and further comprises a first penetration which intersects the first major surface, the first major surface further comprises a first attachment area located about the perimeter of the penetration;
wherein the first penetration comprises the packing material; and wherein the non-porous adhesive article is fixedly attached to the first attachment area.

In another aspect, a firestop system is described comprising a non-porous adhesive article comprising a substrate and an adhesive disposed on a first major surface of the substrate; a packing material; and a construction assembly comprising a first major surface and an opposing second major surface and a first penetration which intersects the first major surface, the first major surface comprising a first attachment area located about the perimeter of the penetration;
wherein the first penetration comprises the packing material; and wherein the non-porous adhesive article is fixedly attached to the first attachment area.

In yet another aspect, a method of making a firestop is described comprising
(a) providing a construction assembly comprising a first major surface and an opposing second major surface and further comprising a first penetration which intersects the first major surface, the first major surface further comprises a first attachment area located about the perimeter of the penetration,
(b) inserting a packing material into the first penetration; and then
(c) sealing the first penetration by fixedly attaching a non-porous adhesive article to the first attachment area of the first major surface to form a firestop system.

The above summary is not intended to describe each embodiment. The details of one or more embodiments of the invention are also set forth in the description below. Other features, objects, and advantages will be apparent from the description and from the claims.

BRIEF DESCRIPTION OF THE DRAWINGS

Shown in FIG. 1A is a top view

Shown in FIG. 2 is a side-view of a firestop system disclosed herein comprising a through penetration.

DETAILED DESCRIPTION

As used herein, the terms

"construction assembly" refers to a building construction such wall or floor comprising two opposing major surfaces wherein each major surfaces comprises a structural element;

"penetration" refers to an opening (or hole) which intersects a major surface of a construction assembly to allow for access to the interior of the construction assembly or to enable the passage of penetrating objects through the construction assembly;

"penetrating object" refers to a physical item that passes through the penetration and extends beyond the surface of the construction assembly. Such penetrating objects include cables, conduits, ducts, pipes, etc.);

"membrane penetration" refers to a penetration located on only one major surface of the construction assembly;

"through penetration" refers to construction assembly having an through hole wherein there are penetrations on both opposing major surfaces of the construction assembly;

"blank" refers to a penetration in a construction assembly that does not have a penetrating object;

"a", "an", and "the" are used interchangeably and mean one or more; and

"and/or" is used to indicate one or both stated cases may occur, for example A and/or B includes, (A and B) and (A or B).

Also herein, recitation of ranges by endpoints includes all numbers subsumed within that range (e.g., 1 to 10 includes 1.4, 1.9, 2.33, 5.75, 9.98, etc.).

Also herein, recitation of "at least one" includes all numbers of one and greater (e.g., at least 2, at least 4, at least 6, at least 8, at least 10, at least 25, at least 50, at least 100, etc.).

The present disclosure is directed toward the treatment of openings within construction assemblies of a building to make a firestop (also referred to herein as a firestop system). Surprisingly, it has been discovered that packing the opening with a packing material and sealing the opening with a non-porous adhesive article, such as a tape, can provide a firestop system. Construction assemblies such as horizontal and vertical assemblies (e.g., floors, walls, and ceilings) have a required fire rating based on the construction materials and building code requirements. Once an opening is made into the assembly, the fire-rating is compromised. The purpose of the firestop is to restore the fire-rating back to the original rating of the assembly.

In one embodiment, the firestop is a fire-rated system, which passes an approved regiment of testing. Such tests include: ASTM method E814-13a "Standard Test Method for Fire Tests of Penetration Firestop Systems and the UL (Underwriters Laboratory) standard 1479 (R2012) "Fire Tests of Through-Penetration Firestops". UL 1479 is similar to ASTM E814 having a fire endurance test as well as a hose stream test, but also includes optional tests for air leakage and water leakage. Other tests include CAN/ULC-S115-11 "Standard Method of Fire Tests of FireStop Systems"; EN 1366-3:2009 "Fire Resistance Tests for Service Installations—Penetration Seals"; AS 1530.4-2005 "Methods of Fire Tests on Building Materials, Components and Structures Part 4: Fire Resistance Test of Elements of Construction"; ISO 834-11: 2014 "Fire Resistance Test—Elements of Building Construction-Part 11: Specific Requirements of the Assessment of Fire Protection to Structural Steel Elements"; BS 47n Fire Tests; and ISO 10295-1:2007 "Fire Tests for Building Elements and Components—Fire Testing of Service Installations—Part 1: Penetration Seals".

To pass an approved fire test, the firestop systems of the present disclosure (comprising the construction assembly, the penetration, the packing material, the adhesive article, and the penetrating object, if present) need to withstand a defined temperature profile (for example, exceeding temperatures greater than 700° C.) for a period of time (as described in the standards). In one embodiment, the systems of the present disclosure need to pass a hose stream test, wherein a stream of water at a given pressure and time (as described in the standards) is delivered onto the system after the fire endurance test. The system is then rated based on the outcome of the tests. For example, if there are no failures at 1 hour following the test methods, the system is then rated for 1-hour. In one embodiment, the fire-resistant system of the present disclosure withstands the approved regiment of testing for a period of at least 30 minutes, at least 1 hour, at least 2 hours, or even at least 4 hours.

According to ASTM E814 there are two ratings for a firestop system. An F rating is based on when a flame occurrence on the cold side of the wall (the surface away from the fire). A T rating is based on the temperature rise as well as the flame occurrence on the cold side of the wall. These rating are used, along with the presence and type of a penetrating object and the location of the opening, to evaluate the firestop system's performance.

As mentioned above, the UL standard 1479 also includes an optional air leakage test (ability of the assembly to withstand pressure differentials) and water leakage test (ability of the assembly to withstand intermittent water exposure, e.g., rain, standing water, spills, etc.), which can then result in an L rating and W rating, respectively.

In one embodiment, the assemblies of the present disclosure pass ASTM E814 and/or UL 1479. In one embodiment, the assemblies of the present disclosure also pass the optional air leakage test and/or the water leakage test of UL 1479.

In the present disclosure, the construction assembly can comprise a membrane penetration or a through penetration. As is known in the art and described in industry standard test methods, if the assembly has a symmetric through penetration only one side of the assembly is tested to determine the rating. However, if the assembly comprises a membrane penetration or an asymmetric through penetration, then each side (front and back) of the assembly is independently tested to ensure that the wall or floor is restored back it its original rating and/or meets the desired building requirements.

Figure 1A:
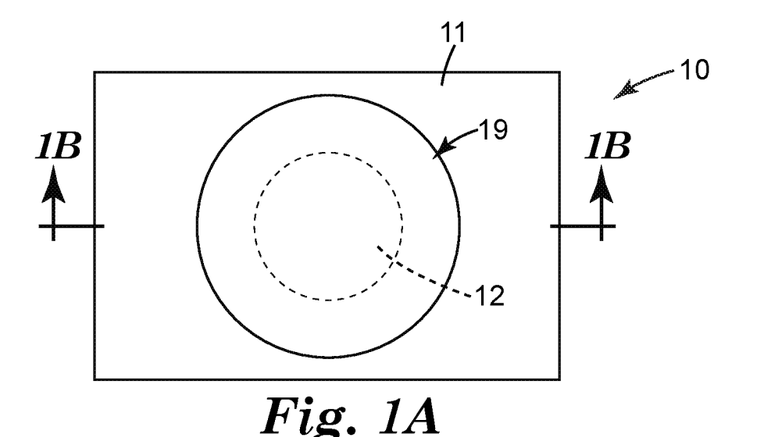
Figure 1B:
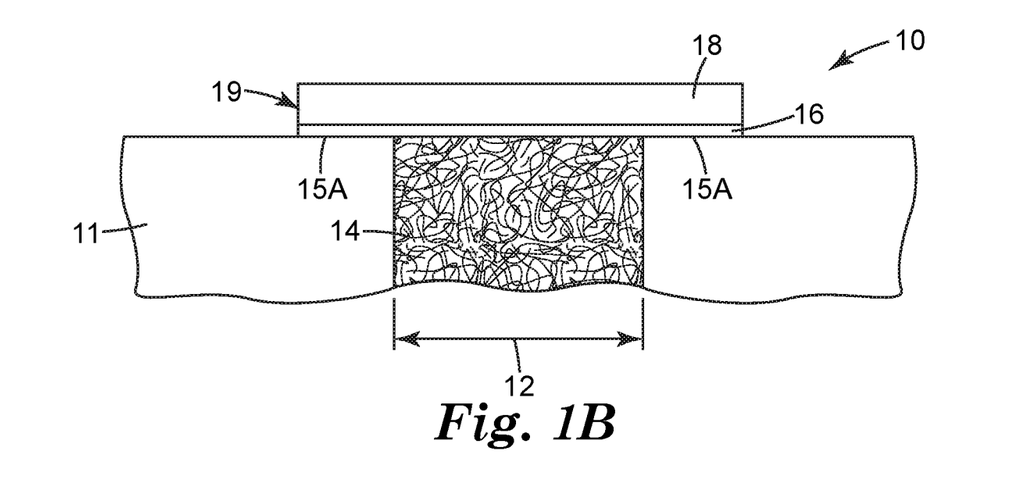
FIG. 1B is a side-view of one side of a firestop system disclosed herein.

FIG. 1 depicts an exemplary configuration of a firestop system of the present disclosure, where FIG. 1A is a top view and FIG. 1B is a side view of a blank. Firestop system 10 is a firestop system comprising structural element 11, which also comprises penetration 12 which extends through structural element 11. Penetration 12 is at least partially filled with packing material 14. Non-porous adhesive article 19 is applied over penetration 12, wherein the non-porous adhesive article is fixedly attached via adhesive 16 to first attachment area 15A of the structural element.

Figure 2:
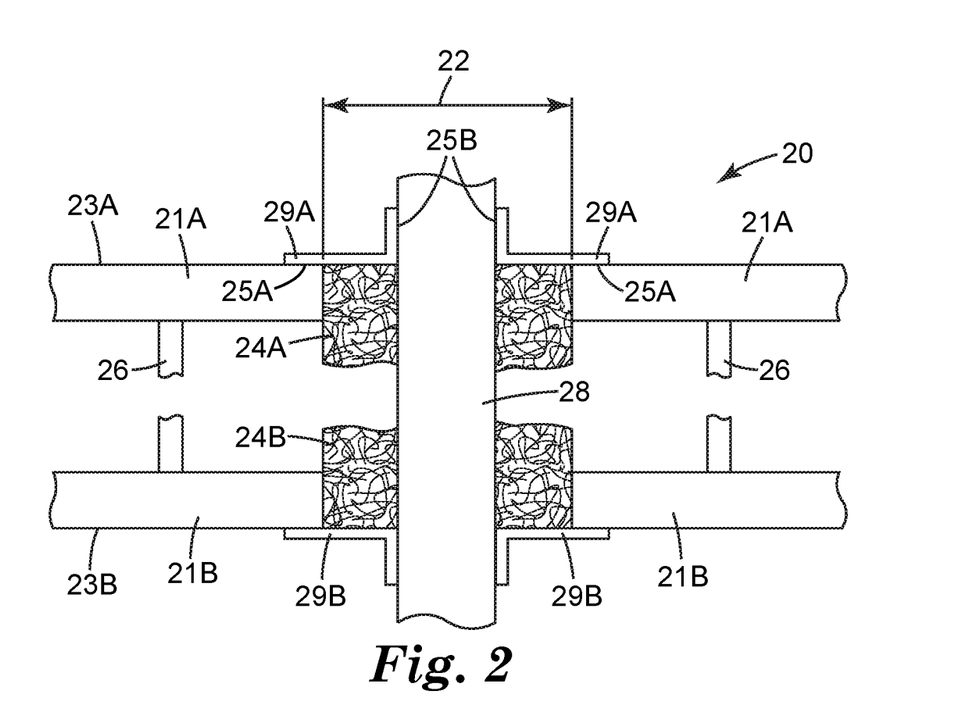

FIG. 2 depicts an exemplary configuration of a firestop system of the present disclosure. System 20 includes a construction assembly comprising structural elements 21A and 21B supported by stud 26 comprising through penetration 22. Through penetration 22 intersects first major surface 23A and opposing second major surface 23B. Penetrating object 28 passes through the construction assembly via penetration 22. Packing material 24A and 24B is placed into penetration 22 around penetrating object 28. First major surface 23A comprises a first attachment area 25A around the perimeter of the penetration. Penetrating object 28 comprises a second attachment area 25B around its perimeter near the intersection of the penetration with first major surface 23A. Adhesive article 29A is fixedly attached to first attachment area 25A and second attachment area 25B, sealing the first major surface of the construction assembly. Similarly, adhesive article 29B is fixedly attached to second major surface 23B and penetrating object 28, sealing the second major surface of the construction assembly.

Depicted in FIGS. 1 and 2 are penetrations occurring along the face of a planar surface of a construction assembly, which encompass a majority of the penetrations in the construction industry. However, in one embodiment, a penetration can occur at the meeting of two structural elements that may be at an angle relative to each other, such as penetration in a floor-to-wall or head-of-wall.

When the system comprises a penetrating object, in one embodiment, the adhesive article can withstand the differential movement of the penetrating object relative to the construction assembly in non-fire conditions due to, for example, expanding and contracting of the penetrating object and shifting of the penetrating object relative to the construction assembly.

It is an objective of the present disclosure that the system is fire-resistant. In one embodiment the firestop system of the present disclosure passes a fire-rating test such that the system meets the desired fire-rating. It is also an objective in the present disclosure that in one embodiment, the adhesive article seals the penetration and is the assembly comprises a penetrating object, the seal not be compromised during the shifting of the penetrating object and the construction assembly relative to one another during non-fire conditions.

The penetrations disclosed herein occur in building constructions, thus, the non-porous adhesive article of the present disclosure is fixedly attached to structural elements made of construction materials such as gypsum wallboard (i.e., sheetrock), metal (e.g., steel, aluminum), cement (e.g., Portland cement concrete), concrete, mortar, masonry (e.g., brick and cement blocks), wood, plastics, and combinations thereof.

These penetrations can occur at various locations and numbers along a construction assembly. The shape (circular, oblong, rectangular, etc.) and width of the opening can vary. In one embodiment, the length of the smallest dimension of the opening is at least 0.125, 0.25, 0.5, 0.75, 0.825, 1, 2, 3, 4, or even 5 inch (3.1, 6.4, 12.7, 19, 21, 25, 51, 76, 102, or even 127 mm); and at most 16, 48, or even 60 inches (406, 1219, or even 1524 mm). Typically, in the larger opening dimensions a penetrating object is present and will consume a portion of the opening. Therefore, the amount of the penetration requiring sealing with the adhesive article will be a portion of the dimension of the penetration. For example, a wall comprising a 2 inch diameter circular opening with a 1.5 inch diameter pipe therethrough would require sealing of the opening in the wall around the perimeter of the pipe (about 0.25 inches around the outside of the pipe).

The penetrating objects can be made from a variety of materials commonly used in the construction industry including, for example, metal, glass, fiberglass, and plastic (including polyethylene, polypropylene, polyvinyl chloride, and fluorinated plastics such as polytetrafluoroethylene (PTFE)).

The packing material of the present disclosure is a high-temperature resistant material, as is known in the art (e.g., a material being thermally stable up to a temperature of at least about 150° C., 200° C., 300° C., 400° C., or even 500° C.). Exemplary high-temperature resistant material include ceramic fiber, glass fiber, mineral fiber (also known as mineral wool, basalt, or rock wool), intumescent and endothermic packing materials, and combinations thereof. These materials may be used as fabrics, mats, bats, sheets, or loose fill.

Exemplary ceramic fibrous materials include ceramic oxide fibers such as small diameter melt-blown aluminosilicate ceramic fibers commercially available, for example, under the trade designations "FIBERFRAX DURABACK BLANKET" from Carborundum Co. of Niagara Falls, N.Y., and aluminosilicate fibers commercially available, for example, under the trade designations "CERAWOOL" and "KAOWOOLII" from Thermal Ceramics of Augusta, Ga.; and ceramic oxide fibers commercially available, for example, from the 3M Company under the trade designation "NEXTEL" (e.g., aluminosilicate ceramic oxide fibers, aluminoborosilicate ceramic oxide fibers commercially available under the trade designation "NEXTEL 312", and alumina ceramic oxide fibers commercially available under the trade designation "NEXTEL 610"). Exemplary mineral wool (such as, mineral wool derived from blast furnace slag having the major components silica, calcia, alumina, and magnesia) include those available, for example, under the trade designation "THERMOFIBER" from U.S. Gypsum of Chicago, Ill. Exemplary blends include, for example, a blend of mineral wool and glass fiber available under the trade designation "3M Fire Barrier Packing Material PM4" available from 3M Co., St. Paul, Minn.

In one embodiment the packing material is free of intumescent materials and/or from endothermic materials. In another embodiment, the packing material is constructed from intumescent materials or from endothermic materials. Intumescent materials are materials that when exposed to heat or flames, expand typically at exposure temperatures above about 200° C., and serve as a barrier to heat, smoke, and flames. Exemplary intumescent material include polymeric binders, fillers, and intumescent particles (e.g., silicates, expanding graphite, and vermiculite) such as those known in the art. Endothermic materials absorb heat and are used to shield construction components from the effects of high temperatures. Useful endothermic mat materials are available, for example, under the trade designation "INTERAM MAT E-5" from 3M Co. St. Paul, Minn. These high temperature resistant materials are generally sufficiently flexible to conform to complex shapes and to conform to dimensional changes due to movement in a dynamic joint.

The packing material of the present disclosure can have resilient properties which permit the material to be pressure fit in the opening and around the penetration, if present. Typically, the packing material is installed in compression (e.g., 50% compression) to maximize fiber density and prevent loss of fit due to e.g., sagging or slipping.

In one embodiment, when filling the opening, the packing material is added such that it is in a compressed state at the space's nominal width. The depth of packing (i.e., the distance the packing material fills beginning from the first outer surface and extending into the wall cavity) for the packing material can depend on the desired rating and the thermal resistance of the packing material as is known in the art. For example, for a wall having 1.25 inches (31.8 mm) of gypsum wallboard and a 3.5 inch (88.9 mm)-wide opening, a 2 hour fire-rating is achieved when filling the wall to full depth with mineral wool, whereas the 2 hour fire-rating can be achieved by using half or less than half of the fill depth with ceramic fiber. The space inside the wall can be packed with the packing material at its full depth (i.e., the entire length between the two walls such as in FIG. 2) for maximum fire-rating (e.g., longest time) or a fraction thereof, which may result in a lower fire-rating.

The adhesive article of the present disclosure is a multi-layer article comprising a substrate and an adhesive thereon. Other layers as known in the adhesive art may be present, such as a primer layer between the substrate and the adhesive and/or a coating (e.g., ink or low-adhesive backsizing) located on the second major surface of the substrate, opposite the adhesive layer, which is located on the first major surface of the substrate.

Adhesive materials useful in the present disclosure include those that allow adhesion to a variety of construction surfaces, including, for example, concrete, metal (e.g., aluminum or steel), and gypsum wallboard. Adhesive materials suitable for the practice of the present invention include silicones, acrylics, poly alpha olefins, ethylene/vinyl acetate, urethanes, and natural or synthetic rubbers. In one embodiment, the adhesive is a pressure sensitive adhesive.

Suitable urethane resins include polymers made from the reaction product of a compound containing at least two isocyanate groups (—N═C═O), referred to herein as "isocyanates", and a compound containing at least two active-hydrogen containing groups. Examples of active-hydrogen containing groups include primary alcohols, secondary alcohols, phenols, and water. A wide variety of isocyanate-terminated materials and appropriate co-reactants are well known, and many are commercially available for example, polyuerethane dispersion based PSA's from Dow Chemical Co. Also see, for example, Gunter Oertel, "Polyurethane Handbook", Hanser Publishers, Munich (1985)).

In one embodiment, active-hydrogen compounds containing primary and secondary amines can react with an isocyanate to form a urea linkage, thereby making a polyurea.

Suitable acrylic resins include acrylic pressure sensitive adhesives (PSAs). Acrylic PSAs comprise a (meth)acrylate ester monomer which is a monomeric (meth)acrylic ester of a non-tertiary alcohol, wherein the alcohol contains from 1 to 20 carbon atoms and preferably an average of from 4 to 14 carbon atoms.

Examples of monomers suitable for use as the (meth)acrylate ester monomer include the esters derived from either acrylic acid or methacrylic acid and non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 3,7-dimethylheptanol, 1-decanol, 1-dodecanol, 1-tridecanol, 1-tetradecanol, citronellol, dihydrocitronellol, and the like. In some embodiments, the preferred (meth)acrylate ester monomer is the ester of (meth)acrylic acid with butyl alcohol or isooctyl alcohol, or a combination thereof. In one embodiment, the (meth)acrylate ester monomer is present in an amount of 80 to 99 parts by weight based on 100 parts total monomer content used to prepare the polymer. Preferably (meth)acrylate ester monomer is present in an amount of 90 to 95 parts by weight based on 100 parts total monomer content.

The (meth)acrylic polymer further comprises a polar comonomer. For example, an acid group-containing comonomer. Examples of suitable acid-group containing monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl (meth)acrylate, styrene sulfonic acid, 2-acrylamido-2-methylpropanesulfonic acid, vinylphosphonic acid, and mixtures thereof.

Due to their availability, acid functional monomers of the acid functional copolymer are generally selected from ethylenically unsaturated carboxylic acids, i.e. (meth)acrylic acids. When even stronger acids are desired, acidic monomers include the ethylenically unsaturated sulfonic acids and ethylenically unsaturated phosphonic acids. In one embodiment, the acid functional monomer is generally used in amounts of 0 to 10 parts by weight, preferably 1 to 5 parts by weight, based on 100 parts by weight total monomer.

Other polar monomers may also be polymerized with (meth)acrylate ester monomer to form the polymer. Representative examples of other suitable polar monomers include but are not limited to 2-hydroxyethyl (meth)acrylate; N-vinylpyrrolidone; N-vinylcaprolactam; acrylamide; mono- or di-N-alkyl substituted acrylamides, such as for example t-butyl acrylamide, dimethylaminoethyl acrylamide, and N-octyl acrylamide; poly(alkoxyalkyl) (meth)acrylates including 2-(2-ethoxyethoxy)ethyl (meth)acrylate, 2-ethoxyethyl (meth)acrylate, 2-methoxyethoxyethyl (meth)acrylate, 2-methoxyethyl methacrylate, polyethylene glycol mono(meth)acrylates and mixtures thereof. Exemplary polar monomers include those selected from the group consisting of 2-hydroxyethyl (meth)acrylate and N-vinylpyrrolidone. In one embodiment, the other polar monomer may be present in amounts of 0 to 10 parts by weight, preferably 1 to 5 parts by weight, based on 100 parts by weight total monomer.

When used, vinyl monomers useful in the (meth)acrylate polymer include: alkyl vinyl ethers (e.g., vinyl methyl ether); vinyl esters (e.g., vinyl acetate and vinyl propionate), styrene, substituted styrene (e.g., α-methyl styrene), vinyl halide, and mixtures thereof. Such vinyl monomers are generally used at 0 to 5 parts by weight, preferably 1 to 5 parts by weight, based on 100 parts by weight total monomer.

In order to increase cohesive strength and improve the performance at elevated temperatures of the coated adhesive composition, a multifunctional (meth)acrylate (comprising more than more acrylate group) may be incorporated into the blend of polymerizable monomers. Multifunctional acrylates are particularly useful for emulsion or syrup polymerization. Examples of useful multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof. The amount and identity of multifunctional (meth)acrylate is tailored depending upon application of the adhesive composition. Typically, the multifunctional (meth)acrylate is present in amounts less than 5 parts based on based on 100 parts by weight total monomer. In one embodiment, the multifunctional (meth)acrylate may be present in amounts from 0.01 parts to 1 part based on 100 parts total monomers of the adhesive composition.

Optional co-monomers can be used to tailor the performance of the PSA. Optional co-monomers include those having at least two different reactive groups e.g., 2-OH (meth) acrylate and glycidyl (meth)acrylate.

In one embodiment, the (meth)acrylic polymer can be crosslinked with thermal cross-linking agents, which are activated by heat, and/or photosensitive crosslinking agents, which are activated by ultraviolet (UV) light. Useful photosensitive cross-linking agents include: multifunctional (meth)acrylates, triazines, and combinations thereof. Exemplary crosslinking agents include substituted triazines such as 2,4,-bis(trichloromethyl)-6-(4-methoxy phenyl)-s-triazine, 2,4-bis(trichloromethyl)-6-(3,4-dimethoxyphenyl)-s-triazine, and the chromophore-substituted halo-s-triazines disclosed in U.S. Pat. Nos. 4,329,384 and 4,330,590 (Vesley). Various other crosslinking agents with different molecular weights between (meth)acrylate functionality may also be useful.

In one embodiment, glycidyl (meth)acrylate may be used as a thermal crosslinking agent to provide functionality which can be activated upon or after application in the field. For example, when the adhesive article is exposed to an elevated temperature, (e.g., a fire) the epoxy group of the glycidyl (meth)acrylate may react to provide further crosslinking, which can further increase the cohesive strength and increase the temperature resistance.

Suitable silicone resins include moisture-cured silicones, condensation-cured silicones, and addition-cured silicones, such as hydroxyl-terminated silicones, silicone rubber, and fluoro-silicone. Examples of suitable commercially available silicone PSA compositions comprising silicone resin include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. An example of a two-part silicone resin is commercially available under the trade designation "SILASTIC J" from Dow Chemical Company, Midland, Mich.

Pressure sensitive adhesives (PSAs) can include natural or synthetic rubbers such as styrene block copolymers (styrene-butadiene; styrene-isoprene; styrene-ethylene/butylene block copolymers); nitrile rubbers, synthetic polyisoprene, ethylene-propylene rubber, ethylene-propylene-diene monomer rubber (EPDM), polybutadiene, polyisobutylene, butyl rubber, styrene-butadiene random copolymers, and combinations thereof.

Additional pressure sensitive adhesive include poly(alpha-olefins), polychloroprene, silicone elastomers. In some embodiments, polychloroprene and silicone elastomers may be preferred since polychloroprene contains a halogen, which can contribute towards flame resistance, and silicone elastomers are resistant to thermal degradation.

In one embodiment, the pressure sensitive adhesives may also contain one or more conventional additives. Preferred additives include tackifiers, plasticizers, flame retardants, foaming agents, dyes, antioxidants, and UV stabilizers.

In some embodiment, a tackifing agent maybe required to provide the desired adhesive characteristics. Styrene block copolymers or (meth)acrylic polymers may include a suitable tackifying resin. Suitable tackifiers include rosin acids, rosin esters, terpene phenolic resins, hydrocarbon resins, and cumarone indene resins. The type and amount of tackifier can affect properties such as tack, bond strength, heat resistance, and specific adhesion. Exemplary tackifiers include: hydrogenated hydrocarbons available under the trade brands "REGALITE" and "REGALREZ", by Eastman Chemical Co., Middelburg, Netherlands; and "ARKON" by Arakawa Chemical Inc., Chicago, Ill.; glycerin rosin ester available under the trade designation "FORAL 85" from Eastman Chemical Co., Kingsport, Tenn.; hydrocarbon or rosin types are available under the series "ESCOREZ" from ExxonMobil Chemical, Houston, Tex.; hydrocarbon resins available under the series trade designation "WINGTACK" from Cray Valley, Exton, Pa.; and terpene phenolic tackifiers available under the trade designation "SYLVARES TP96" from Arizona Chemical, Jacksonville, Fla.

In one embodiment, the PSA may contain a plasticizer, which can help soften the adhesive, and as a result, the structural element of the construction assembly is more easily wetted by the adhesive. Further, the use of a plasticizer may improve the adhesive properties, including peel. The plasticizer may be hydrophobic and/or hydrophilic.

In one embodiment, the pressure sensitive adhesive is selected from at least one of an acrylic copolymer and a tackified styrene block copolymer. For example, in one embodiment, the adhesive article must pass the tests for movement in as described in ASTM E1399/E1399M-97 (2013) "Standard Test Method for Cyclic Movement and Measuring the Minimum and Maximum Joint Widths of Architectural Joint Systems".

In one embodiment, the adhesive should have such properties that allow the adhesive article to move if the penetrant moves relative to the construction assembly.

In one embodiment, the adhesive has a 90° peel strength according to ASTM D6252/6252M-98 (2011) at a strain rate of 12 inches/minute of at least 0.7, 0.8, 1, 1.5, or even 2 lb/in on the structural element of the construction assembly such as gypsum wallboard and/or concrete. However, the acceptable peel strength can be dependent upon the overlap (or attachment area) of the adhesive article to the structural element. For example, with larger adhesive overlaps, lower peel strengths may be acceptable; whereas with smaller attachment overlaps, higher peel strengths may be necessary. In one embodiment, the adhesive articles of the present disclosure are not resealable, meaning that the adhesive articles cannot be sealed into place and then at some time point later, removed and reused to seal the penetration.

In one embodiment, the adhesive is disposed on at least one major surface of a substrate. In one embodiment, the adhesive is a continuous layer across the first major surface of the substrate, wherein the adhesive covers at least 20, 40, 50, 70, 80, 90, 99, or even 100% of one major surface of the substrate. The adhesive is applied at a thickness sufficient to adhere the adhesive article to a building's structural elements. The thickness of the adhesive typically ranges from about 2 mil (50 micrometers) to about 30 mil (762 micrometers). A thick layer of adhesive material may be desirable for some applications, for example so that the adhesive material conforms to an irregular surface of the structural element (e.g., concrete). Preferably, the adhesive forms a layer with sufficient adhesion between the adhesive article and the construction assembly. The time required for the adhesion to develop may vary due to humidity and/or ambient temperature.

The substrate of the adhesive article may be selected from a polymeric film, a paper, a nonwoven matrix, a woven matrix, a metallic sheet, a foam, and combinations thereof. Exemplary substrates include polyolefins such as polyethylene, polypropylene (including isotactic polypropylene), polystyrene, polyester (such as poly(ethylene terephthalate) and poly(butylene terephthalate), polyvinyl alcohol, poly (caprolactam), poly(vinylidene fluoride), polylactides, cellulose acetate, and ethyl cellulose and the like. Commercially available backing materials useful include Kraft paper (available from Monadnock Paper, Inc.); cellophane (available from Flexel Corp.); spun-bond poly(ethylene) and poly(propylene), available under the trade designation "TYVEK" and "TYPAR" (available from DuPont, Inc.); and porous films obtained from poly(ethylene) and poly(propylene), available under the trade designation "TESLIN" (available from PPG Industries, Inc.), and "CELLGUARD" (available from Hoechst-Celanese).

The substrate can be selected based on the application. The substrate should be stable (i.e., does not auto-ignite or distort) at temperatures of at least 80° C., 85° C., 90° C., 93° C., 95° C., 98° C., 100° C., 150° C., 180° C., or even 200° C. to withstand the elevated temperatures experienced on the cold side of the system during a fire. In one embodiment, the substrate has some flexibility allowing the adhesive article to absorb some of the movement between a penetrating object and the construction assembly and/or the pressure experienced from a fire hose. In one embodiment, a polyolefin substrate is selected due to its resistance to humidity changes, as opposed to a paper backing, which may be preferred from a lifetime durability standpoint.

The adhesive article of the present disclosure is non-porous. The Gurley second or Gurley unit is a unit describing the number of seconds required for 100 cubic centimeters (1 deciliter) of air to pass through 1.0 square inch of a given material at a pressure differential of 4.88 inches of water. The lower the Gurley second, the more porous the material. In one embodiment, the adhesive article has a Gurely value of greater than 5, 10, 20, 40, or even 60 Gurley seconds. It is believed that the non-porosity of the adhesive article is important for sealing of the penetration, preventing air and gas passage.

In one embodiment, the adhesive article can be used in a roll format, sheet, or a die cut shape. In one embodiment, the adhesive article comprises a liner, which is removed from the adhesive side of the adhesive article prior to application to the construction assembly.

In the present disclosure, the penetration is filled with the packing material and the adhesive article is placed over the penetration, contacting the major surface of the construction assembly and the penetration object, if present, forming the firestop system. In one embodiment, the adhesive of the adhesive article contacts the packing material.

In one embodiment, the opening is a blank penetration, which does not comprise a penetrating object and the adhesive article is flush with the face of the major surface of the construction assembly, as shown in FIG. 1B.

In another embodiment, a penetrating object extends beyond the surface of the construction assembly comprising the opening shown in FIG. 2. In this embodiment, one portion of the adhesive article is fixedly attached to the major surface of the construction assembly, while another portion of the adhesive article is fixedly attached to the penetrating object. The adhesive article should sufficiently overlap the major surface of the construction assembly and the penetrating object, if present, to maintain contact and maintain a seal over the lifetime of the firestop. In other words, the adhesive article sufficiently covers the opening or the space between the opening and the penetrating object, to seal the opening, preventing the spread of fire and/or gases. In one embodiment, the adhesive article overlaps the opening by at least 0.25, 0.5, 0.75, 1, 2, or even 4 inches (6.4, 12.7, 19, 25.4, 50.8, or even 101.6 mm) around the perimeter of the opening; and at most 6 or even 12 inches (152.4, or even 304.8 mm). In other words, the adhesive article contacts the first attachment area by at least 0.25 inches. The acceptable overlap of the adhesive article with the attachment area can depend on the nature of the structural element (e.g., concrete versus gypsum) of the construction assembly; adhesive used (e.g., the 90 degree peel strength as mentioned above); and/or the flexibility of the substrate (e.g., more overlap needed for substrates that are not as flexible).

Heretofore the means for sealing such penetrations has been to insert an insulation batting or to spray foam, putty, or caulk into the gap. Using an adhesive article as disclosed herein for a firestop system has advantages over the putties, caulk and spray coating, including the ability to use over a broader working range (for example, at temperatures below 4° C. and in wet conditions) with little preparation of the structural elements, and ease of use (i.e., rolling a strip of tape down a wall wherein the adhesive is contained up the adhesive substrate).

Although not wanting to be limited by theory, it is believed that in the present disclosure, the packing material acts as a thermal barrier helping to minimize the temperatures experienced by the adhesive article on the "cold side" of the structure. In other words, the side of the wall away from the fire. It is also believed that the adhesive article acts as a non-porous barrier minimizing a stack effect (i.e., movement of air resulting from pressure, temperature, and/or moisture differences). These stack effects can lead to potential spreading of combustion products (e.g., flame, and/or hot gases including smoke, and heat) from one area to another throughout the building.

It has been discovered that packing the opening with a packing material and sealing with a non-porous adhesive article, such as a tape, provides a firestop system with a fire rating for 30 minutes, 1 hour, 2 hours, or even 4 hours. This is surprising because as mentioned above, the fire-rated assembly must meet the fire test and water hose test as disclosed in ASTM E814 and/or UL 1479. Furthermore, construction sites are typically thought of as dirty, with dust, dirt, etc. In one embodiment, the adhesive articles disclosed herein can be applied to the structural elements (such as gypsum board and concrete) and penetrating objections without clean-up or priming. Still further, in one embodiment, the adhesive articles disclosed herein can be applied to water saturated structural elements such as cement concrete and still fixedly attach to the structural element.

Exemplary embodiments which are useful for understanding the present disclosure include the following.

Embodiment 1

Use of a non-porous adhesive article and a packing material, on a construction assembly to provide a firestop system, wherein the non-porous adhesive article comprises a substrate and an adhesive disposed on a first major surface of the substrate;

wherein the construction assembly comprises a first major surface and an opposing second major surface and further comprises a first penetration which intersects the first major surface, the first major surface further comprises a first attachment area located about the perimeter of the penetration;

wherein the first penetration comprises the packing material; and wherein the non-porous adhesive article is fixedly attached to the first attachment area.

Embodiment 2

The use as in embodiment 1, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

Embodiment 3

The use as in any one of the previous embodiments, wherein the second major surface comprises a second penetration which intersects the second major surface of the construction assembly, the second major surface further comprises a third attachment area located about the perimeter of the second penetration; wherein the second penetration comprises the packing material; and wherein the non-porous adhesive article is fixedly attached to the third attachment area.

Embodiment 4

The use as in embodiment 3, further comprising a penetrating object having a fourth attachment area, wherein the penetrating object passes through the second penetration and extends beyond the second major surface of the construction assembly, wherein the non-porous adhesive article is fixedly attached to the third attachment area and the fourth attachment area.

Embodiment 5

The use as in any one of embodiments 2-4, wherein the penetrating object is selected from at least one of a conduit, a pipe, a cable, a tray, and a duct.

Embodiment 6

The use as in any one of embodiments 2-5, wherein the penetrating object comprises at least one of metal, glass, fiberglass, and plastic.

Embodiment 7

The use as in any one of the previous embodiments, wherein the non-porous adhesive article comprises an adhesive selected from at least one of an epoxy, an acrylic, a urethane, a silicone, and a rubber.

Embodiment 8

The use as in of any one of the previous embodiments, wherein the adhesive is a pressure sensitive adhesive.

Embodiment 9

The use as in of any one of the previous embodiments, wherein the adhesive comprises at least one of (i) an acrylic adhesive and (ii) a styrene block copolymer and a tackifier.

Embodiment 10

The use as in any one of the previous embodiments, wherein the substrate is selected from at least one of a polymeric film, a paper, a nonwoven matrix, a woven matrix, a metallic sheet, and a foam.

Embodiment 11

The use as in any one of the previous embodiments, wherein the packing material is selected from at least one of mineral wool, ceramic fiber, glass fiber, and rockwool.

Embodiment 12

The use as in any one of the previous embodiments, wherein the penetration has a smallest dimension of at least 6.4 mm.

Embodiment 13

The use as in any one of the previous embodiments, wherein the construction assembly comprises at least one of cement, gypsum, wood, metal, and plastic.

Embodiment 14

A firestop system comprising
(a) a non-porous adhesive article comprising a substrate and an adhesive disposed on a first major surface of the substrate;
(b) a packing material; and
(c) a construction assembly comprising a first major surface and an opposing second major surface and a first penetration which intersects the first major surface, the first major surface comprising a first attachment area located about the perimeter of the penetration;
wherein the first penetration comprises the packing material; and wherein the non-porous adhesive article is fixedly attached to the first attachment area.

Embodiment 15

The firestop system of embodiment 14, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

Embodiment 16

The firestop system of any one of embodiments 14-15, wherein the second major surface comprises a second penetration which intersects the second major surface of the construction assembly, the second major surface further comprises a third attachment area located about the perimeter of the second penetration; wherein the second penetration comprises the packing material; and wherein the non-porous adhesive article is fixedly attached to the third attachment area.

Embodiment 17

The firestop system of embodiment 16, further comprising a penetrating object having a fourth attachment area, wherein the penetrating object passes through the second penetration and extends beyond the second major surface of the construction assembly, wherein the non-porous adhesive article is fixedly attached to the third attachment area and the fourth attachment area.

Embodiment 18

The firestop system of any one of embodiments 15-17, wherein the penetrating object is selected from at least one of a conduit, a pipe, a cable, a tray, and a duct.

Embodiment 19

The firestop system of any one of embodiments 15-18, wherein the penetrating object comprises at least one of metal, glass, fiberglass, and plastic.

Embodiment 20

The firestop system of any one of embodiments 14-19, wherein the non-porous adhesive article comprises an adhesive selected from at least one of an epoxy, an acrylic, a urethane, a silicone, and a rubber.

Embodiment 21

The firestop system of any one of embodiments 14-20, wherein the adhesive is a pressure sensitive adhesive.

Embodiment 22

The firestop system of any one of embodiments 14-21, wherein the adhesive comprises at least one of (i) an acrylic adhesive and (ii) a styrene block copolymer and a tackifier.

Embodiment 23

The firestop system of any one of embodiments 14-22, wherein the substrate is selected from at least one of a polymeric film, a paper, a nonwoven matrix, a woven matrix, a metallic sheet, and a foam.

Embodiment 24

The firestop system of any one of embodiments 14-23, wherein the packing material is selected from at least one of mineral wool, ceramic fiber, glass fiber, and rockwool.

Embodiment 25

The firestop system of any one of embodiments 14-24, wherein the penetration has a smallest dimension of at least 6.4 mm.

Embodiment 26

The firestop system of any one of embodiments 14-25, wherein the construction assembly comprises at least one of cement, gypsum, wood, metal, and plastic.

Embodiment 27

The firestop system of any one of embodiments 14-26, wherein the firestop system passes Fire Test 1.

Embodiment 28

The firestop system of any one of embodiments 14-27, wherein the firestop system passes Fire Test 2.

Embodiment 29

The firestop system of any one of embodiments 14-28, wherein the firestop system passes at least one of ASTM E-814-13a and UL 1479.

Embodiment 30

The firestop system of any one of embodiments 14-29, wherein the non-porous adhesive article can withstand differential movement between the penetrating object and the construction assembly.

Embodiment 31

A method of making a firestop system comprising
(a) providing a construction assembly comprising a first major surface and an opposing second major surface and further comprising a first penetration which intersects the first major surface, the first major surface further comprises a first attachment area located about the perimeter of the penetration,
(b) inserting a packing material into the first penetration; and then
(c) sealing the first penetration by fixedly attaching a non-porous adhesive article to the first attachment area of the first major surface to form a firestop system.

Embodiment 32

The method of embodiment 31, wherein the construction assembly further comprises a penetrating object having a second attachment area, wherein the penetrating object passes through the first penetration and extends beyond the first major surface of the construction assembly, and sealing the first penetration by fixedly attaching the non-porous adhesive article to the first attachment area and the second attachment area.

Embodiment 33

The method of any one of embodiments 31-32, wherein the second major surface of the construction assembly comprises a second penetration which intersects the second major surface of the construction assembly, the second major surface further comprises a third attachment area located about the perimeter of the second penetration; optionally, inserting the packing material into the second penetration; and sealing the second penetration by fixedly attaching a non-porous adhesive article to the third attachment area of the second major surface to form a firestop system.

Embodiment 34

The method of embodiment 33, wherein the construction assembly further comprises a penetrating object having a fourth attachment area, wherein the penetrating object passes through the second penetration and extends beyond the second major surface of the construction assembly, and sealing the second penetration by fixedly attaching the non-porous adhesive article to the third attachment area and the fourth attachment area.

EXAMPLES

Advantages and embodiments of this disclosure are further illustrated by the following examples, but the particular materials and amounts thereof recited in these examples, as well as other conditions and details, should not be construed to unduly limit this invention. In these examples, all percentages, proportions and ratios are by weight unless otherwise indicated.

All materials are commercially available, for example from Sigma-Aldrich Chemical Company; Milwaukee, Wis., or known to those skilled in the art unless otherwise stated or apparent.

The following abbreviations are used: cm=centimeter; dia.=diameter; in=inch; lb=pound; mm=millimeter; m=meter; and ft=foot.

Test Methods
Gypsum Wall Construction

A wall was constructed as a 2 hour fire-rated construction consisting of gypsum board/steel stud assembly constructed of the materials and in the manner described in the individual U400-Series Wall or Partition Design in the UL Fire Resistance Directory (2014) and included the following construction features: Wall framing consisted of steel channel studs. Steel studs were a minimum 3⅝ in. (92 mm) wide by 1¼ in. (32 mm) deep with a minimum 25 gauge steel channels. Steel stud spacing was a maximum of 24 in. (610 mm) on center. Two layers ⅝ in. (16 mm) thick gypsum wallboard, as specified in the individual U400-Series Design were used on each side of the wall.

Various sized wall constructions were made, wherein each wall was a box comprising steel studs along the 4 minor sides with a front surface of gypsum board and a back surface of gypsum board. Two or three sections of walls were aligned next to one another to create a linear through penetration of about 2 in (5.1 cm), unless stated otherwise. The assembly was placed into an external metal frame and secured during testing.

Concrete Floor Construction

A floor was constructed as a 2 hour fire-rated construction with a minimum 4½ in. (114.3 mm) thick steel-reinforced lightweight structural concrete. The floor was a slab of concrete 35 in (889 mm) by 35 in (889 mm). A void was created by creating an opening through the front face of the floor and exiting out the back face of the floor. A penetrant may or may not have been placed such that it goes through one side of the void and exits out the other side of the void.

Fire Test 1

The construction was tested according to Underwriters Laboratory Inc., Standard for Safety UL 1479 "Fire Tests of Through-Penetration Firestops". One side of the construction was exposed to fire at temperatures following UL 1479 for 2 hours followed by the Hose Stream evaluation. The construction contained a minimum of one void.

There are three primary results associated with the UL 1479 testing procedure: Flame (or F-Rating), Temperature (or T-Rating), and Hose Stream.

Flame (F-Rating)—The firestop system is exposed to elevated temperatures (e.g., a controlled fire). The system need to withstand the fire test for the rating period without permitting the passage of flame through penetration, or the occurrence of flaming on any element of the unexposed side. If any passage of flame or flaming is noted, this section of the testing fails.

Temperature (T-Rating)—While the firestop system is exposed to elevated temperatures, the installation achieves its T-Rating when the temperature on the cold side of the system exceeds 181° C. above ambient. For example, if ambient temperature is 23° C. and the temperature on the cold side of the wall exceeds 204° C., this results in a T-Rating at that time. A rating is assigned to the firestop system based upon when the assembly fails the temperature requirements. If the system passes 204° C. after 2 hours, the firestop system has a 2 hour T-Rating. If the system passes 204° C. after 15 minutes, the firestop system has a 15 minute T-Rating.

Hose Stream—The firestop system is first exposed to elevated temperatures. Then, the system is exposed to water dispensed through a high pressure fire hose. During the hose stream testing the firestop system should not develop any openings that would permit a projection of water from the hose stream beyond the unexposed side. If any water transfers beyond the unexposed side of the firestop system, this is a failure which results in a failure for both the F-Rating and the T-Rating.

Fire Test 2

Fire Test 2 was similar to Fire Test 1, except that only the Flame and Temperature results were evaluated. Thermocouples were placed at two locations per substrate sample—approximately at ⅓ and ⅔ of the length of each substrate material, centered on the middle of the opening on the cold side of the wall (the opposite side of the fire).

Fire Test 3

Fire Test 3 was similar to Fire Test 1, except the system was only exposed to fire for 1 hour. At the conclusion of the fire exposure, the hose stream test was performed. In fire Test 3 only the Hose Stream results were evaluated and thermocouples were not used to measure temperature during testing.

Porosity

The porosity was measured using a Model 4110 Genuine Gurley Densometer, Gurley Precision Instruments, Troy, N.Y. Samples were clamped within the densometer's one square inch port, and the Gurley values were measured following ISO 5636-5:2003 "Paper and board—Determination of air permeance (medium range)—Part 5: Gurley method".

Peel Adhesion Test

The 90 degree angle peel adhesion test was performed generally as described in ASTM D6252/6252M-98 (2011) "Standard Test Method for Peel Adhesion of Pressure-Sensitive Label Stocks at a 90° Angle". The samples were cut into 1 in (2.54 cm) wide strips. The construction assembly materials (concrete or gypsum wallboard) were wiped clean with only a cloth, and the strips were adhered by hand to the stated construction assembly material with a rubber roller using hand pressure. A dwell time of between 5 sec and 60 sec was employed, and the sample was measured for 90 degree angle peel adhesion at a speed of 12 in/min. The testing was done at 23° C. and 50% relative humidity. Results are reported in lbs/in.

Materials Table

| Material | Description |
|---|---|
| Tape 398 FR | A flame retardant tape comprising a glass cloth backing with a pressure sensitive acrylic adhesive available under the trade designation "3M GLASS CLOTH TAPE 398 FR" from 3M Co., St. Paul, MN |
| Tape 8067 | An acrylic pressure sensitive adhesive tape available under the trade designation "3M ALL-WEATHER FLASHING TAPE 8067" from 3M Co., with a tape thickness of (0.0099 in) 0.25 mm with a backing thickness of (0.005 in) 0.13 mm. |
| Vinyl Tape | A tape available under the trade designation "3M 471 YELLOW VINYL TAPE" from 3M Co. |
| Al Foil | A tape available under the trade designation "3M 425 DWB ALUMINUM FOIL TAPE" from 3M Co. |
| Duct Tape | A tape available under the trade designation "3M 3939 HEAVY DUTY DUCT TAPE" from 3M Co. |
| PTFE Tape | A tape available under the trade designation "3M PTFE FILM TAPE 5490" from 3M Co. |
| Polyimide Tape | A tape available under the trade designation "3M 5413 POLYIMIDE FILM TAPE" from 3M Co. |
| Film 2024 | A sheet good available under the trade designation "STYLE 2024 REEMAY SPUNBONDED POLYESTER NONWOVENS" from Kavon Filter Products Co., Farmingdale, NJ |
| Tyvek | A film available under the trade designation "DUPONT TYVEK HOMEWRAP" from DuPont, Wilmington, DE |
| ZIP Tape | A tape available under the trade designation "ZIP System tape" from J.M. Huber Corp., Edison, NJ |
| CW Tape | A tape available under the trade designation "VENTURE TAPE 1525CW-3" from Venture Tape, Rockland, MA |
| Tape 1100 | A tape available under the trade designation "3M TEMFLEX CORROSION PROTECTION TAPE 1100" from 3M Co. |
| Masking Tape | A tape available under the trade designation "3M 232 MASKING TAPE" from 3M Co. |
| Tape 06147 | A tape available under the trade designation "SCOTCH ELCTRICAL MOISTURE SEALANT ROLL 06147" from 3M Co. |

Materials Table

| Material | Description |
|---|---|
| Tape 3750 | A tape available under the trade designation "3M SCOTH COMMERCIAL GRADE SHIPPING PACKAGING TAPE 3750" from 3M Co. |
| Mineral Wool | Available from Roxul Inc., Ontario, Canada |
| FIP | Intumescent urethane foam available under the trade designation "3M FIP 1-STEP FIRE BARRIER RATE FOAM" from 3M Co. |

EXAMPLES

Comparative Example 1: Firestop Comprising a Fire Retardant Tape

Walls were made following the Gypsum Wall Construction above. A wall assembly was constructed with two walls (16 in (406 mm) by 35 in (889 mm)) having a 2 inch (51 mm) width by 35 in (889 mm) linear through opening therebetween. A flame retardant tape, Tape 398 FR, was placed over the entire length of the linear through opening on both sides of the wall assembly, overlapping the gypsum wallboard by a minimum of 3.81 cm (1.5 in.) on each side of the opening The system was tested following Fire Test 1. The system failed the Flame, Temperature, and Hose Stream tests.

Example 1: Through Penetration Firestop

The Concrete Floor Construction described above was used. Four 5 in (127 mm) diameter and one 2 in (51 mm) diameter circular voids were created through the concrete floor assembly. Penetrating objects as listed in Table 1 below were placed through these voids extending past the face(s) of the floor. A packing material as shown in Table 1 was fit into openings of the floor, filling around the penetrating object, if present. The mineral wool was compressed into the penetration and installed at full depth of the assembly at 11.43 cm (4.5 in.). FIP was placed into the penetration and also installed at full depth of the floor. Tape 8067, liner removed if present, was placed over and in contact with the packing material, overlapping the concrete by a minimum of 2.54 cm (1 in.) on each side of the opening, and overlapping the penetrating object, if present, by a minimum of 6 mm. Tape 8067 was place on the cold side of the floor only (side away from the fire). The firestop system was tested following Fire Test 1 for Flame, Temperature, and Hose Stream and the results are shown in Table 1 below.

TABLE 1

| Sample | Packing Material | Void diameter | Penetrating object | F-Rating (min) | T-Rating (min) | Hose Stream |
|---|---|---|---|---|---|---|
| 1 | Mineral wool | 5 inches | None | 120 | 120 | Pass |
| 2 | Mineral wool | 5 inches | 2 in. (51 mm) dia. cellular core polyvinyl chloride (ccPVC) pipe with wrap strip | 120 | 7 | Pass |
| 3 | Mineral wool | 5 inches | 2 in. (51 mm) dia. copper pipe | 120 | 13 | Pass |
| 4 | Mineral wool | 5 inches | 2 in. (51 mm) dia. cast iron pipe | 120 | 26 | Pass |
| 5 | FIP | 2 inches | None | 120 | 120 | Pass |

Substrate Screen A

Walls were made following the Gypsum Wall Construction above. A wall assembly was constructed with three walls in the following order A: 10 in (254 mm) by 84 inch (213 mm); B: 24 inch (610 mm) by 84 inch (213 mm); and C: 32 inch (813 mm) by 84 inch (213 mm) having an average 1.63 inch (41 mm) width by 84 inch (2134 mm) length opening between walls A and B and between walls B and C. A 7.62 cm (3 in.) wide piece of mineral wool (Roxul Inc.) was compressed to fit into both linear openings. The mineral wool was installed full depth of the wall assembly at 15.24 cm (6 in.).

Instead of running a single piece of tape down the entire length of the linear opening, various materials were tested along the length of the opening for substrate screening. The various substrate materials (shown in Table 2 below), liners removed if present, were placed along the length of the each opening (either 2 or 3 substrates used to cover 1 linear opening) covering the length of the opening on the cold side of the wall. Tape 8067 was used to hold the substrate material in place on the wall assembly. Tape 8067 was used to frame each of the substrate materials, overlapping the substrate materials by a minimum of 0.64 cm (0.25 in) as they were held to the gypsum wall. Tape 8067 did not (or minimally) overlapped the linear opening along its length. Where the different substrate materials met on the linear joint, they were covered with a strip of Tape 8067 in order to maintain a seal. Substrates were placed only on the cold side of the floor (side away from the fire). The joint system was then tested following Fire Test 2.

The substrates tested and the results from Fire Test 2 are described in the Table 2 below.

TABLE 2

| Sample | Material | Substrate | Thickness of the substrate (mm)* | Flame | Temperature |
|---|---|---|---|---|---|
| 1 | Vinyl Tape | Vinyl | 0.1 | fail | fail |
| 2 | Tape 06147 | Vinyl | 0.2 | pass | pass |
| 3 | Al Foil | Dead-soft aluminum | 0.07 | pass | pass |
| 4 | Duct Tape | polyethylene laminated to cloth reinforcement | 0.2 | pass | pass |
| 5 | PTFE Tape | polytetra-fluoroethylene | 0.05 | pass | pass |
| 6 | Polyimide Tape | polyimide | 0.07 | pass | pass |

*Data collected from published technical data sheets

Substrate Screen B

A wall assembly was constructed as described in Substrate Screen A above. A 7.62 cm (3 in.) wide piece of mineral wool (Roxul Inc.) was compressed to fit into both linear openings (2 inch width by 84 inch length each). The mineral wool was installed full depth of the wall assembly at 15.24 cm (6 in).

Instead of running a single piece of tape down the entire length of the opening, various materials were tested along the length of the opening for substrate screening. The various substrate materials (shown in table 1 below), liners removed if present, were placed along the length of the each opening (either 2 or 3 substrates used to cover 1 linear opening) covering the length of the opening on the cold side of the wall. Tape 8067 was used to hold the substrate material in place on the wall assembly. Tape 8067 was used to frame each of the substrate materials, overlapping the substrate materials by a minimum of 0.64 cm (0.25 in) as they were held to the gypsum wall. Tape 8067 did not (or minimally) overlapped the linear opening along its length. Where the different substrate materials met on the linear joint, they were covered with a strip of Tape 8067 in order to maintain a seal. The joint system was then tested following Fire Test 2. The results are shown in Table 3 below.

The various substrate materials were tested following the Porosity Test described above. The results are also shown in Table 3 below.

TABLE 3

| | | | Fire Test 2 | | Porosity |
|---|---|---|---|---|---|
| Sample | Material | Substrate | Fire | Temperature | Gurley sec |
| 1 | Film 2024 | Spunbound polyester nonwoven | Fail | Fail | <1 |
| 2 | Tyvek | Spunbound olefin nonwoven | Fail | Fail | 5 |
| 3 | PTFE | Extruded polytetra-fluoroethylene | Pass | Pass | >60 |
| 4 | Polyimide | Polyimide | Pass | Pass | >60 |

As shown in Table 3, if the porosity of the adhesive article is 5 Gurley seconds or less, the sample failed the fire and temperature testing for the 2-hour rating.

Adhesion Screening A

A wall assembly was constructed as described in Substrate Screen A above. A 7.62 cm (3 in.) wide piece of mineral wool (Roxul Inc.) was compressed to fit into both linear openings (2 inch (51 mm) width by 84 (2134 mm) inch length each). The mineral wool was installed full depth of the wall assembly at 15.24 cm (6 in). Instead of running a single piece of tape down the entire length of the opening as done above, various tapes were tested along the length of the opening for adhesion screening. The various substrate materials (shown in Table 3 below), liners removed if present, were placed along the length of the each opening (up to 9 substrates were used to cover 1 linear opening) covering the length of the opening on the cold side of the wall only. Not only was the adhesive varied, but the amount of overlap of the sample has on each side of the linear opening was varied. Fire Test 3 was initiated within 10 minutes or less of the PSA samples being applied to the gypsum wall assemblies. The results are shown in Table 4.

Adhesion Screening B

A floor assembly was constructed as described in Example 2 above. A 10.2 cm (4 in.) wide piece of mineral wool (Roxul Inc.) was compressed to fit into the linear opening (2 inch (51 mm) width by 35 inch (889 mm) length each). The mineral wool was installed full depth of the floor assembly at 114 mm (4.5 in.). The various substrate materials (shown in Table 3 below), liners removed if present, were placed along the length of the each opening (3 substrates used to cover 1 linear opening) covering the length of the opening on the cold side of the floor only. Not only was the adhesive varied, but the amount of overlap of the sample has on each side of the linear opening was varied. Fire Test 3 was initiated within 10 minutes or less of the PSA samples being applied to the concrete floor assemblies. The results are shown in Table 4.

Separately, the various PSA tapes were also tested for adhesion on concrete and/or gypsum wallboard following the Peel Adhesion Test described above. These results are also shown in Table 4 below.

TABLE 4

| | | | Peel Adhesion | | Fire Test 3 | |
| --- | --- | --- | --- | --- | --- | --- |
| Sample | Material | Adhesive Type | Structural Element | (lbs/in) | Overlap inches (mm) | Hose Stream |
| 1 | Tape 8067 | Acrylic | Concrete | 3.2 | 1 (25 mm) | Pass |
| 2 | ZIP Tape | Acrylic | Concrete | 2 | 1 (25 mm) | Pass |
| 3 | Duct Tape | Rubber | Concrete | 0.7 | 2 (51 mm) | Fail |
| 4 | Al Foil | Acrylic | Concrete | 0.4 | 1 (25 mm) | Fail |
| 5 | CW Tape | Acrylic | Concrete | 0.4 | 1 (25 mm) | Fail |
| 6 | Polyimide Tape | Silicone | Concrete | 0.3 | 2 (51 mm) | Fail |
| 7 | PTFE Tape | Silicone | Concrete | 0.3 | 1 (25 mm) | Fail |
| 8 | TAPE 1100 | Rubber | Concrete | 0.1 | 1 (25 mm) | Fail |
| 9 | Tape 8067 | Acrylic | Gypsum | >2* | 2 (51 mm) | Pass |
| 10 | Tape 8067 | Acrylic | Gypsum | >2* | 0.5 (13 mm) | Pass |
| 11 | Al Foil | Acrylic | Gypsum | 1.1 | 4 (102 mm) | Pass |
| 12 | Al Foil | Acrylic | Gypsum | 1.1 | 2 (51 mm) | Fail |
| 13 | ZIP Tape | Acrylic | Gypsum | 1.9 | 1 (25 mm) | Pass |
| 14 | ZIP Tape | Acrylic | Gypsum | 1.9 | 0.5 (13 mm) | Fail |
| 15 | CW Tape | Acrylic | Gypsum | 0.8 | 2 (51 mm) | Pass |
| 16 | CW Tape | Acrylic | Gypsum | 0.8 | 1 (25 mm) | Pass |
| 17 | Duct Tape | Rubber | Gypsum | 0.7 | 2 (51 mm) | Fail |
| 18 | Duct Tape | Rubber | Gypsum | 0.7 | 1 (25 mm) | Fail |
| 19 | Masking Tape | Rubber | Gypsum | 0.5 | 2 (51 mm) | Fail |
| 20 | PTFE Tape | Silicone | Gypsum | 0.4 | 2 (51 mm) | Fail |
| 21 | Polyimide Tape | Silicone | Gypsum | 0.3 | 2 (51 mm) | Fail |
| 22 | 3750 Tape | Rubber | Gypsum | 0.3 | 2 (51 mm) | Fail |

*during removal, the paper from the surface of the gypsum wallboard tore before the tape could be removed Water Saturated Surface Screening Initial Peel: Tape 8067 was applied to a sample of concrete. After 5 minutes of contact, Tape 8067 was removed by hand.

Wet Peel: Approximately 10 ml of water was applied to the surface of a sample of concrete. Within less than 1 min, a piece of Tape 8067 was applied onto the wet concrete. After 5 minutes of contact, Tape 8067 was removed by hand.

There was little to no difference noted when removing the Tape 8067 between the Initial and Wet Peels.

Foreseeable modifications and alterations of this invention will be apparent to those skilled in the art without departing from the scope and spirit of this invention. This invention should not be restricted to the embodiments that are set forth in this application for illustrative purposes.

What is claimed is:

1. A method of using a first non-porous adhesive article and a first packing material on a construction assembly to provide a firestop system, the method comprising:
    obtaining a construction assembly comprising a first major surface and an opposing second major surface and further comprising a first penetration which intersects the first major surface, the first major surface further comprises a first attachment area located about the perimeter of the first penetration, the construction assembly further comprising a penetrating object having a second attachment area, wherein the penetrating object passes through the first penetration and extends beyond the first major surface of the construction assembly and the first penetration comprises the packing material; and
    using the first non-porous adhesive article to fixedly attach the first attachment area of the construction assembly to the second attachment area of the penetrating object via an adhesive, wherein the adhesive has a 90° peel strength according to ASTM D6252/6252M-98 (2011) at a strain rate of 12 inches/minute of at least 0.8 lb/in with a 1 inch overlap on concrete, and wherein the first non-porous adhesive article comprises a substrate and the adhesive disposed on a first major surface of the substrate and wherein the first non-porous adhesive article has a Gurley value greater than 10 Gurley seconds and wherein the substrate is selected from at least one of a polymeric film, a paper, a nonwoven matrix, a woven matrix, and a foam.

2. The method of claim 1, wherein the second major surface comprises a second penetration which intersects the second major surface of the construction assembly, the second major surface further comprises a third attachment area located about the perimeter of the second penetration; wherein the second penetration comprises a second packing material; and wherein a second non-porous adhesive article is fixedly attached to the third attachment area.

3. The method of claim 2, further comprising the penetrating object having a fourth attachment area, wherein the penetrating object passes through the second penetration and extends beyond the second major surface of the construction assembly, wherein the second non-porous adhesive article is fixedly attached to the third attachment area and the fourth attachment area.

4. The method of claim 1, wherein the first non-porous adhesive article comprises an adhesive selected from at least one of an epoxy, an acrylic, a urethane, a silicone, and a rubber.

5. The method of claim 1, wherein the adhesive is a pressure sensitive adhesive.

6. The method of claim 1, wherein the adhesive comprises at least one of (i) an acrylic adhesive and (ii) a styrene block copolymer and a tackifier.

7. The method of claim 1, wherein the first packing material is selected from at least one of mineral wool, ceramic fiber, glass fiber, and rockwool.

8. A firestop system comprising
(a) a non-porous adhesive article comprising a substrate and an adhesive disposed on a first major surface of the substrate wherein the non-porous adhesive article has a Gurley value greater than 10 Gurley seconds and wherein the substrate is selected from at least one of a polymeric film, a paper, a nonwoven matrix, a woven matrix, and a foam, and wherein the adhesive has a 90° peel strength according to ASTM D6252/6252M-98 (2011) at a strain rate of 12 inches/minute of at least 0.8 lb/in with a 1 inch overlap on concrete;
(b) a packing material; and
(c) a construction assembly comprising a first major surface and an opposing second major surface and a first penetration which intersects the first major surface, the first major surface comprising a first attachment area located about the perimeter of the first penetration; wherein the first penetration comprises the packing material; and wherein the non-porous adhesive article is fixedly attached to the first attachment area.

9. A method of making a firestop system comprising
(a) providing a construction assembly comprising a first major surface and an opposing second major surface and further comprising a first penetration which intersects the first major surface, the first major surface further comprises a first attachment area located about the perimeter of the first penetration,
(b) inserting a packing material into the first penetration; and then
(c) sealing the first penetration by fixedly attaching a non-porous adhesive article to the first attachment area of the first major surface to form a firestop system, wherein the non-porous adhesive article has a Gurley value greater than 10 Gurley seconds and wherein the substrate is selected from at least one of a polymeric film, a paper, a nonwoven matrix, a woven matrix, and a foam, and wherein the adhesive has a 90° peel strength according to ASTM D6252/6252M-98 (2011) at a strain rate of 12 inches/minute of at least 0.8 lb/in with a 1 inch overlap on concrete.

10. The method of claim 1, wherein the penetration has a smallest dimension of at least 6.4 mm.

11. The firestop system of claim 8, further comprising a penetrating object having a second attachment area, wherein the penetrating object passes through the first penetration and extends beyond the first major surface of the construction assembly, wherein the non-porous adhesive article is fixedly attached to the first attachment area and the second attachment area.

12. The firestop system of claim 8, wherein the non-porous adhesive article comprises an adhesive selected from at least one of an epoxy, an acrylic, a urethane, a silicone, and a rubber.

13. The firestop system of claim 8, wherein the adhesive is a pressure sensitive adhesive.

14. The firestop system of claim 8, wherein the adhesive comprises at least one of (i) an acrylic adhesive and (ii) a styrene block copolymer and a tackifier.

15. The firestop system of claim 8, wherein the packing material is selected from at least one of mineral wool, ceramic fiber, glass fiber, and rockwool.

16. The firestop system of claim 8, wherein the firestop system passes Fire Test 1.

17. The firestop system of claim 8, wherein the non-porous adhesive article can withstand differential movement between the penetrating object and the construction assembly.

18. The method of claim 1, wherein the substrate is a polymeric film.

19. The method of claim 9, wherein the substrate is a polymeric film.

* * * * *